3 Sheets—Sheet 1.
R. CONARROE.
Harvester.
No. 204,424. Patented June 4, 1878.
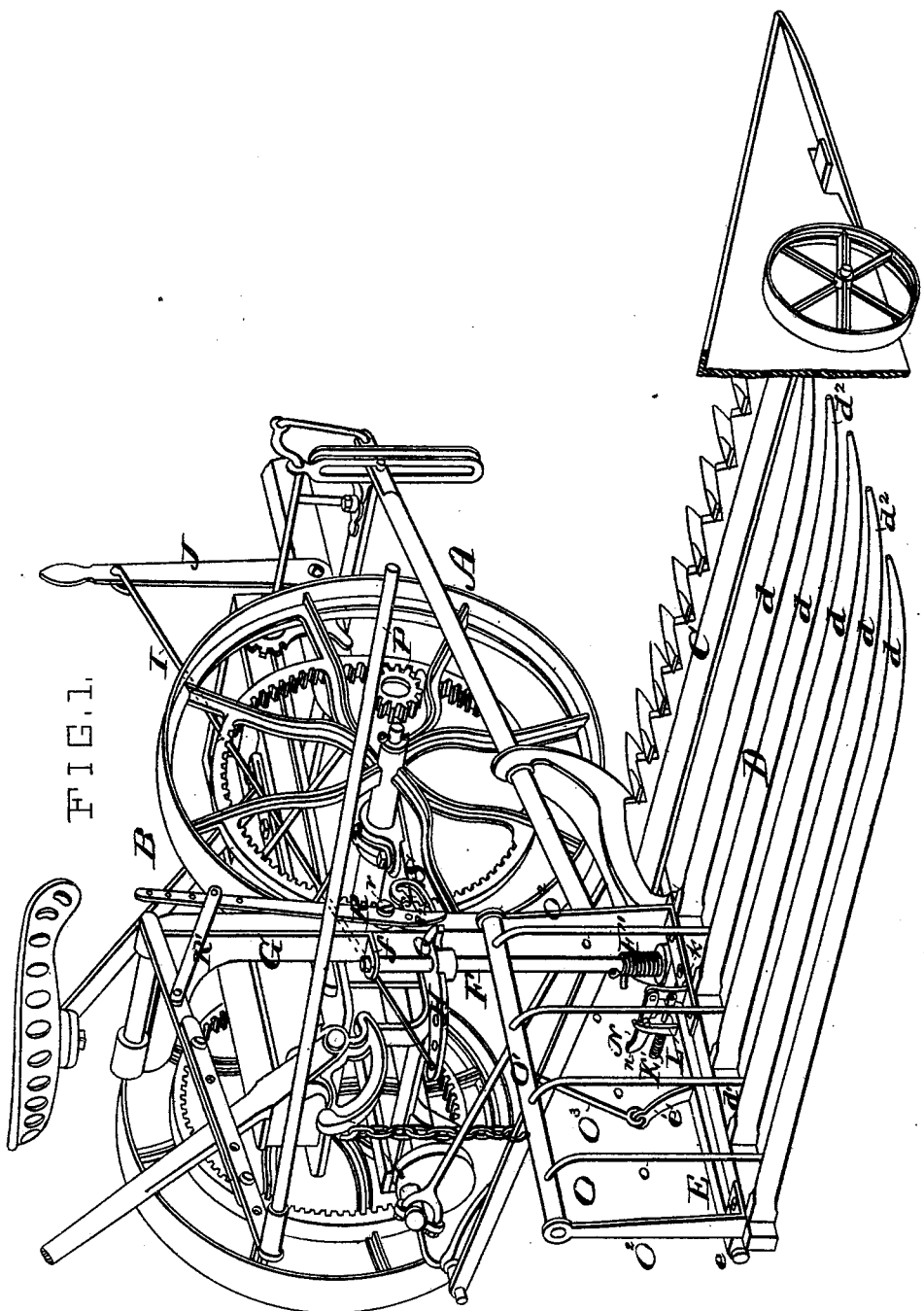
ATTEST,
Saml. S. Boyd
Paul Bakewell
INVENTOR,
Robert Conarroe
by Chas. D. Moody,
atty.

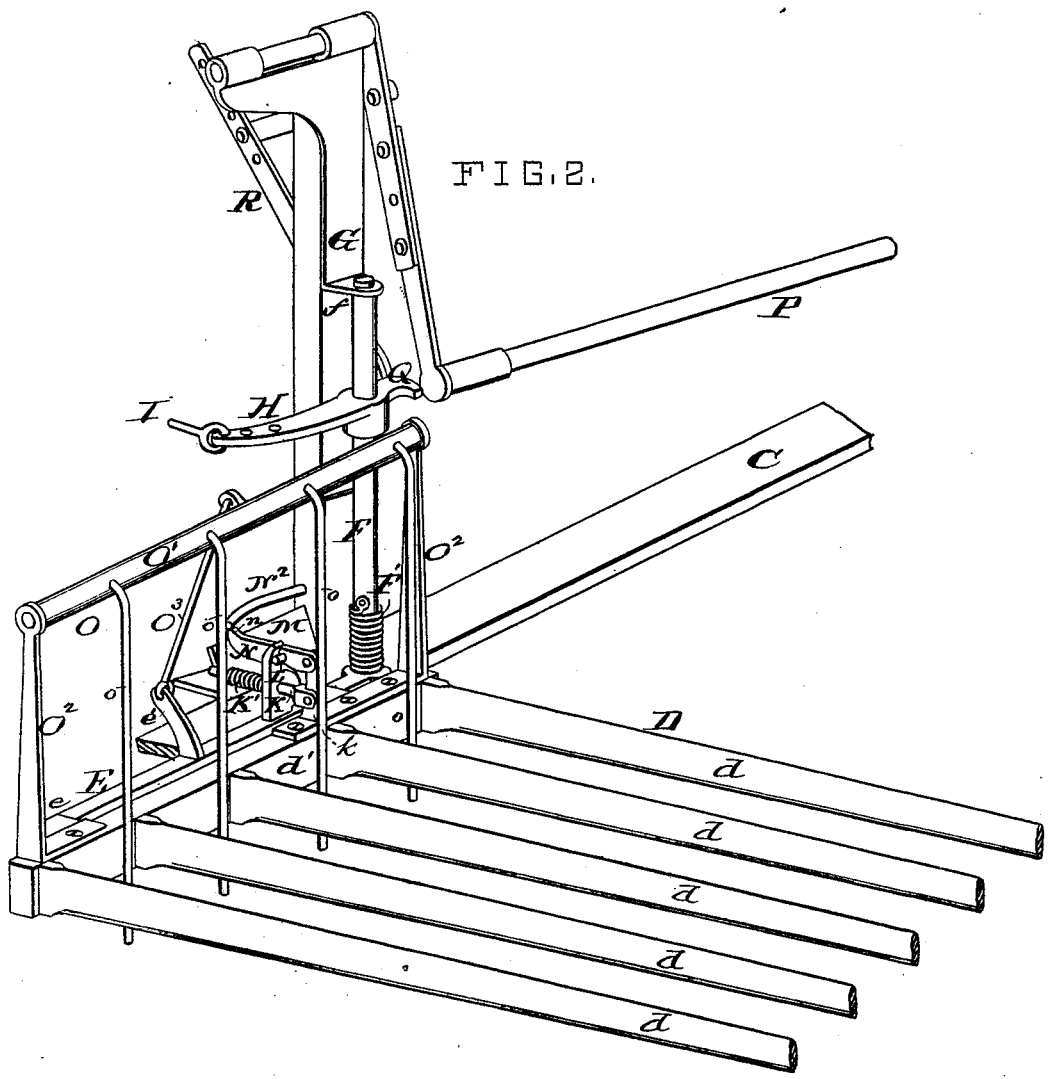

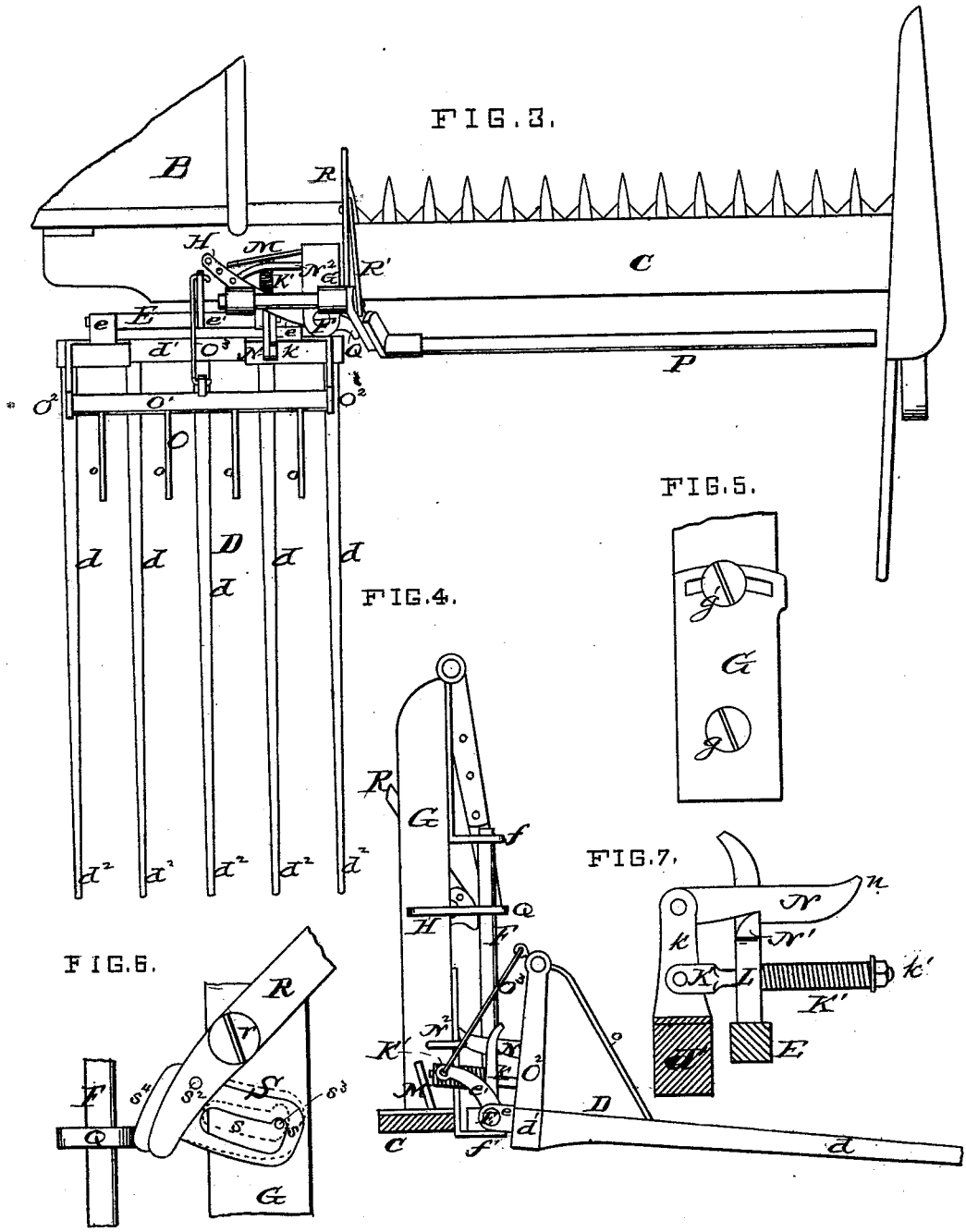

UNITED STATES PATENT OFFICE.

ROBERT CONARROE, OF BELLEVILLE, ILLINOIS, ASSIGNOR OF ONE-HALF HIS RIGHT TO DARWIN W. PRATT, OF SAME PLACE.

IMPROVEMENT IN HARVESTERS.

Specification forming part of Letters Patent No. 204,424, dated June 4, 1878; application filed February 9, 1878.

*To all whom it may concern:*

Be it known that I, ROBERT CONARROE, a resident of Belleville, Illinois, have invented a new and useful Improvement in Harvesters, of which the following is a full, clear, and exact description, reference being had to the annexed drawing, making part of this specification, in which—

Figure 1 is a perspective view of a harvester having the present improvement; Fig. 2, a perspective view of the cradle, showing it as opened out into a position nearly at right angles to the finger-bar, and as about to drop. The supporting-post and the dividing-rod are also shown, and the finger-bar is partly shown. Fig. 3, a plan of the cradle and finger-bar, the cradle being opened out at right angles to the finger-bar; Fig. 4, a side elevation of the cradle and the mechanism immediately therewith connected, the cradle being in the position of Fig. 3; Fig. 5, a detail, being a side elevation, showing the provision for adjusting the cradle; Fig. 6, a detail, being a side elevation, showing the device for locking the dividing-rod; and Fig. 7, a detail, being a side elevation, (from the opposite side of that of Fig. 4,) showing the latch for locking the cradle.

Similar letters have reference to similar parts.

The present invention has relation to that part of the mechanism of a harvester that is employed in disposing of the grain after it is cut. It has especial reference to the construction of the cradle and the means for swinging it to and fro; also, to the means for dropping and lifting the cradle; also, to the device for starting the gavel from off the cradle; also, to the operation of the dividing-rod.

Referring to the annexed drawing, A represents a harvester, which, saving as modified by the present invention, may be of the usual construction, B representing the driving mechanism, and C the finger-bar. D represents the cradle, above referred to, for receiving and carrying off the gavel. It consists of a series of fingers, $d\ d\ d\ d\ d$, projecting from a head or bar, $d^1$. The latter is hinged at $e\ e$ to an arm, E, that stands out horizontally, or thereabout, from a post, F. This last-named part is arranged to turn in bearings $f\ f'$ that are upon a post, G, which may be the ordinary reel-post, or any part suitable for supporting the bearings.

Thus arranged and connected, the cradle can be made to swing from behind the finger-bar (as in Fig. 1) around into the positions successively shown in Figs. 2 and 3. This movement is accomplished by imparting rotary motion to the post F, which may be done by any suitable means. As shown, the post is furnished with an arm, H, from which a connecting-rod, I, leads forward to a lever, J. By pushing the lever forward the cradle and mechanism immediately therewith connected are swung around from the finger-bar, as described. A spring, F', when the lever J is released, acts to turn the post F and cradle back to their original positions.

So far as swinging the cradle to and fro is concerned, the arm E might be dispensed with, and the bar $d^1$ might be attached directly to the post F; but to dislodge the gavel from the cradle after it is swung aside the outer end of the latter must be dropped. The hinged connection of the bar $d^1$ with the arm E provides for this last-named movement; but to enable it to take place at the proper time, and to provide for the varying weights of the gavels, the following mechanism is employed: An arm, K, attached to a post, $k$, that is upon the bar $d^1$, projects through and beyond a bearing, L, that is upon the arm E, and on its outer end is provided with a spring, K', that is held between the head $k'$ of the arm K and the bearing L. This spring acts to uphold the cradle until the head $k'$ encounters a stop, M. This causes the spring to be compressed against and the arm K to be pressed through the bearing L, and the cradle to drop. The arm K is made to strike the stop M just as the cradle comes into the position shown in Fig. 2; and to provide for the movement of the arm after it has encountered the stop, and to enable the cradle to fall the desired distance, the arm K is pivoted to the post $k$ and the stop M is inclined, as shown.

To insure the upholding of the cradle until the arm K strikes the stop M, even when an unusually heavy gavel is being carried, the following additional mechanism is used: A latch, N, pivoted to the post $k$, is made to engage with a catch, $N^1$, that is upon the arm E, and that, for convenience, may be attached to the bearing L. This serves to lock the cradle in a horizontal position until it has been swung into the position shown in Fig. 2, or until the arm K encounters the stop M. The projecting end $n$ of the latch now encounters an inclined plane or deflector, $N^2$, and is thereby lifted, leaving the cradle free to fall, as described. As soon as the cradle begins to swing back toward the finger-bar the spring $K^1$ acts to lift it into a horizontal position again. As the cradle drops, a device, O, called a "starter," is brought into use. Its function is to compress the gavel, and to initiate its dislodgment from the cradle as the latter drops. It consists of a set of fingers, $o\ o\ o\ o$, projecting from a rock-shaft, $O^1$, downward and preferably between the fingers $d\ d\ d\ d\ d$ of the cradle, as shown. The rock-shaft turns in bearings $O^2\ O^2$, that stand up from the head of the cradle. A connecting-rod, $O^3$, leads from the rock-shaft to a projection, $e'$, upon the arm E. By reason of this connection the shaft vibrates as the cradle drops, causing the fingers $o\ o\ o\ o$ to be thrown outward, as in Figs. 3 and 4.

P represents the dividing-rod, which performs the same function in connection with the present invention as with the ordinary dropper. The mode of operating it, however, is as follows: A wiper or cam, Q, attached to the post F, (and preferably made an extension of the arm H,) presses, when the cradle is closed behind the finger-bar, against the lower end of a lever, R, that is pivoted at $r$ to the post G, and causes the upper end of the lever, through the connecting-rod R', to raise the dividing-rod sufficiently for the grain to fall upon the cradle; but when the cradle is opened away from the finger-bar the cam is removed from the lever, and the dividing-rod falls by its own weight, and comes into proper position for supporting the grain until the cradle is brought back again.

It is desirable to lock the dividing-rod when the grain is against it until the cradle is about to return to the finger-bar. Accordingly, I make use of the lock S, Figs. 1 and 6. The latter is of the shape shown, having a slot, $s$, in which is a recess, $s^1$, and it is pivoted at $s^2$ to the lever R. As the cradle is opened out and the dividing-rod falls, the lock drops, causing a stud, $s^3$, that is upon the post G to engage in the recess $s^1$. This serves to fasten the lever R and rod P until the wiper returns to encounter the lever R. The inner end $s^4$ of the lock, however, is made to project slightly beyond the lever R when the lock is down, as in Fig. 6. The cam therefore first strikes the lock, causing it to turn slightly upon its bearing $s^2$, and to disengage it from the stud $s^3$. This leaves the lever R free to be moved by the cam.

The post G is pivoted at $g$, to enable it to be inclined either forward or backward, in order thereby that the cradle may be set at any desired inclination with reference to the finger-bar. When adjusted, it is fastened by the screw $g'$.

In operation, the grain falls crosswise upon the cradle, which is then in the position shown in Fig. 1. The cradle is then swung around horizontally into the position shown in Fig. 2. The cradle now begins to drop, and by the time it has swung a full quarter-turn, as shown in Fig. 3, it has dropped sufficiently for the stubble to catch the gavel. The starter moves against the grain immediately after the cradle has been tilted, compressing the gavel, and giving it sufficient impulse to readily slide off the cradle. By making the fingers of the starter sufficiently long, the gavel may be dislodged from the cradle, even when the latter remains in a horizontal position; but I prefer to drop the cradle, as described, as thereby the operation of discharging the gavel is materially simplified. As the cradle swings out, the dividing-rod falls in position to support the cut grain until the cradle returns, when the dividing-rod rises again, and the operation is repeated.

The fingers $d\ d$ of the cradle are curved upward at their outer ends, $d^2\ d^2$, both to better hold the gavel as the cradle is swinging around, and to prevent the fingers from catching in the ground when the harvester is being moved backward.

I claim—

1. The combination, in a harvester, of a swinging and dropping platform, D, a rake or sweep, O, and mechanism for causing said rake to operate upon the grain immediately after the platform has been tilted, substantially as and for the purpose set forth.

2. The combination of the cradle D and starter O, having the rock-shaft $O^1$ and the downwardly-projecting fingers $o\ o\ o$, substantially as described.

3. The combination of the cradle D, arm E, post F, arm K, post $k$, bearing L, and spring K', substantially as described.

4. The combination of the cradle D, arms E and K, posts F and $k$, bearing L, spring K', and stop M, substantially as described.

5. The combination of the cradle D, hinges $e\ e$, arms E and K, bearing L, post $k$, and spring K', substantially as described.

6. The combination of the cradle D, post $k$, latch N, catch N', arm K, stop M, and arm E, substantially as described.

7. The combination of the cradle D, arm E, projection $e'$, shaft $O^1$, bearings $O^2\ O^2$, and rod $O^3$, substantially as described.

8. The combination of the cam Q, lever R, dividing-rod P, lock S, post G, and stud $s^3$, substantially as described.

9. The combination of the lock S, lever R, rod R', dividing-rod P, post G, and stud $s^3$, substantially as described.

ROBERT CONARROE.

Witnesses:
 CHAS. D. MOODY,
 SAML. S. BOYD.